United States Patent [19]

Smith et al.

[11] 4,427,481

[45] Jan. 24, 1984

[54] MAGNETIZED HOT MELT ADHESIVE AND METHOD OF PREPARING SAME

[75] Inventors: Ray F. Smith, Blue Springs; Edward J. Mulik, Kansas City, both of Mo.

[73] Assignee: R & D Chemical Company, Kansas City, Mo.

[21] Appl. No.: 7,922

[22] Filed: Jan. 31, 1979

Related U.S. Application Data

[62] Division of Ser. No. 881,173, Feb. 27, 1978.

[51] Int. Cl.³ ............................ C09J 5/00; C04B 35/04
[52] U.S. Cl. .............................. 156/306.6; 156/309.6; 156/327; 264/176 R; 252/62.54; 428/356; 428/900
[58] Field of Search ............... 428/900, 355, 356, 315; 252/62.54, 62.56, 62.63; 156/327, 306, 309, 306.6, 309.6; 264/176 R; 260/37 R, 37 M

[56] References Cited

U.S. PATENT DOCUMENTS

| | | | |
|---|---|---|---|
| 3,078,183 | 2/1963 | Karalus | 428/900 |
| 3,620,875 | 11/1971 | Guglielmo, Sr. et al. | 428/900 |
| 3,668,176 | 6/1972 | Childress | 260/37 EP |
| 3,897,288 | 7/1975 | Fayling | 428/900 |

*Primary Examiner*—William R. Dixon, Jr.

*Attorney, Agent, or Firm*—Harry Falber

[57] ABSTRACT

A permanently magnetized adhesive or sealant is disclosed which preferably comprises a synthetic resin material having a permanently magnetized substance dispersed therein to give the adhesive a substantially permanent, net magnetic field both before and after application and use thereof. The adhesive is advantageously in the form of a self-sustaining strip or the like which can be magnetically fastened to a metallic joint and be shifted thereon as desired to assure proper positioning of the adhesive; heating of the adhesive strip to render the same partially flowable then causes the adhesive directly adjacent the joint to be "pulled" into the latter by virtue of magnetic attraction to produce an effectively sealed joint. The adhesive is preferably manufactured by admixing the desired synthetic resin and other components with a quantity of a magnetizable substance such as barium ferrite, $BaFe_{12}O_{19}$. The admixture is then formed into a shape-retaining body such as an elongated strip, and the dispersed ferrite is permanently magnetized by electrical means to give the strip a net magnetic field. The adhesive hereof finds particular utility in sealing metallic joints in automobile bodies or appliances during manufacture thereof which are difficult or impossible to seal using conventional viscous, flowable adhesives.

4 Claims, 7 Drawing Figures

MAGNETIZED HOT MELT ADHESIVE AND METHOD OF PREPARING SAME

This is a division of application Ser. No. 881,173, filed on Feb. 27, 1978.

BACKGROUND OF THE INVENTION

1. Field of the Invention

The present invention is broadly concerned with adhesives which are particularly suited for use in sealing metallic joints in automobiles, appliances or other metallic structure. More particularly, the invention is concerned with an improved adhesive which includes a permanently magnetized substance within the adhesive for giving the latter a substantially permanent, net magnetic field. The invention also comprehends a method of making the improved magnetized adhesive, and to a method of sealing joints through the use thereof. 2. Description of the Prior Art Various types of adhesives have long been used in the automotive and appliance industry for sealing metallic joints. For example, an adhesive seal is commonly provided along the joint between an automobile fender and the adjacent structural member. The conventional practice in this regard has been to apply a flowable, viscous adhesive along the joint through the use of an appropriate applicator, whereupon the adhesive is allowed to set. Although this technique is feasible where a given joint is easily accessible and the adhesive is applied atop the joint, severe problems are encountered when the joint is inaccessible or where adhesive must be applied to the underside of the joint, as in the case of an automobile fender seal. In such instances it often occurs that the operator, because of inaccessibility of the joint, misapplies the viscous adhesive and in effect "misses" the joint. This necessitates a further application of the adhesive, since after application thereof it is impractical to attempt to shift or otherwise move the adhesive. This of course leads to an excess of adhesive being applied adjacent the joint, which is both costly and unnecessary. In addition, when adhesive is applied to the underside of a joint, the adhesive has a tendency to "sag" under the influence of gravity, and this of course detracts from the integrity of the seal. This problem is also encountered when the automobile or appliance is passed through a curing oven, or when, in use, the metallic joint is subjected to unusual heating. In such cases the adhesive disposed along the underside of the joint will again tend to become partially flowable, and can at this point "sag" as described above.

For all of the above reasons, there is a decided need for an improved adhesive which can be placed by hand or otherwise along a joint, and thereafter be shifted as necessary to assure proper positioning of the adhesive, and which overcomes the problem of adhesive "sag" inherent with most types of conventional adhesives.

U.S. Pat. No. 2,393,541 describes an adhesive which includes finely divided metal particles or alloys having ferro-magnetic properties dispersed therein. Therein adhesives are applied to a nonmetallic joint to be sealed, and are placed in a high frequency electromagnetic field which serves to heat the dispersed particles, and thereby the adhesive itself, by virtue of the well known hysteresis effect. However, Pat. No. 2,393,541 does not describe any adhesive having a permanently magnetized substance therein which gives the adhesive a substantially permanent, net magnetic field. Indeed, this patent is specifically described for use in conjunction with wooden joints, as opposed to those of a metallic variety.

Other patents describing adhesives containing particles subject to hysteresis heating include the following: U.S. Pat. Nos. 2,087,480, 3,249,653, 3,620,875, 3,840,254, 3,959,537 and 4,035,547. The teachings of all of these patents are distinguishable from the present invention on the same basis as outlined above in connection with Pat. No. 2,393,541.

U.S. Pat. No. 2,712,219 describes a process for sealing cartons wherein a filled carton is provided with a metallic insert adjacent the upper end thereof. The carton closure flaps are then folded over the insert, with glue being applied between the flaps. This construction is then passed under an electromagnet which pulls the carton upwards to compress the closure flaps between the magnetic insert and the electromagnet, thus effecting bonding of the closure flaps. This patent also mentions that in lieu of the magnetic insert a material for the same purpose can be sprayed onto the sealing flaps, either as a part of the adhesive or as an underlying layer. Again, however, U.S. Pat. No. 2,712,209 does not describe an adhesive which is so formulated to have a substantially permanent, net magnetic field before and during use thereof.

The following patents are of background interest only to the present invention and relate to iron surface coatings, paints, ion exchange resin beads and coating compositions. None of these patents deal with adhesives, however: U.S. Pat. Nos. 3,709,730, 3,766,074, 3,977,984 and 4,049,566.

SUMMARY OF THE INVENTION

In one aspect, the present invention is concerned with an improved adhesive substance which includes a permanently magnetized material within the adhesive which serves to give the latter a substantially permanent, net magnetic field. It will be readily appreciated that the synthetic resin and like components are not themselves actually magnetized by virtue of the presence of the permanently magnetized material; however, this presence does give the overall adhesive an effective net field, so that the adhesive can be magnetically adhered or fastened to a ferromagnetic surface, for example. A virtually limitless number of adhesives can be used in accordance with the invention, and can be of the thermoplastic or thermosetting variety. In particularly preferred forms, the permanently magnetized substance comprises a particulate material such as barium ferrite, $BaFe_{12}O_{19}$, and the adhesive is in the form of a substantially self-sustaining body such as an elongated strip or the like.

A method of making the adhesives hereof is also disclosed and broadly comprises the steps of admixing the ingredients making up the adhesive, such as synthetic resin materials and other components, along with a permanently magnetizable substance. The admixed adhesive is then permanently magnetized, such as by conventional electrical means, for giving the adhesive a substantially permanent, net magnetic field. In especially preferred methods, the adhesive admixture is formed into a substantially self-sustaining body prior to the magnetization step; this forming can be accomplished in a number of ways, such as by extrusion.

Finally, a method of sealing a joint between two members, at least one of which is metallic, is also within the ambit of the invention. Such methods include the steps of providing a quantity of adhesive having a substantially permanent, net magnetic field, placing the adhesive in covering relationship to the joint and in adhering magnetic contact therewith, and causing at least a portion of the adhesive to be pulled into the joint by virtue of magnetic attraction. In the preferred case where the adhesive is in the form of a self-sustaining strip or the like, the adhesive is first placed over the joint, and is thereafter heated to render the adhesive at least partially flowable, whereby a portion of the adhesive directly adjacent the joint is "pulled" into the joint by virtue of magnetic attraction.

DESCRIPTION OF THE PREFERRED EMBODIMENTS

The permanently magnetized adhesive in accordance with the present invention can be fabricated from a virtually limitless number of starting materials. For example, the adhesives hereof can be of the thermoplastic or thermosetting variety, and contain one or more known synthetic resins as well as other additives such as tackifiers. The base adhesive can therefore be of essentially any desired properties, and can include various starting materials which serve to give the final adhesive the desired qualities.

Likewise, the permanently magnetizable substance or substances used in the adhesives hereof can be of essentially any specific chemical identity, as long as the requirements of the invention are met. That is to say, as long as the magnetizable substance can be substantially permanently magnetized in the adhesive to give the latter a net magnetic field, it is usable in the invention. A particulate substance which has particular utility in this regard is barium ferrite, $BaFe_{12}O_{19}$, but the invention is in no way limited to this specific substance. It should also be understood that, as used in this contect, the term "permanently magnetized" refers to a situation wherein the magnetic field produced by the magnetizable substance, and thus the field of the adhesive itself, is permanent over an effective life span. The term is not intended to necessarily imply that the resultant magnetic field is maintained for an infinite period of time, since it is known that many magnetized substances will lose their magnetic properties slowly over time. It is intended by this term however, to refer to the magnetic field as being present before and during application of the adhesive.

In practice, when a material such as $BaFe_{12}O_{19}$ is dispersed in an adhesive base and thereafter magnetized, the $BaFe_{12}O_{19}$ will assume a pattern in accordance with the electromagnetic field used to permanently magnetize the same. In accordance with the invention, the substance, after magnetization, must be arranged so as to give the adhesive a net magnetic field.

Figure 1:
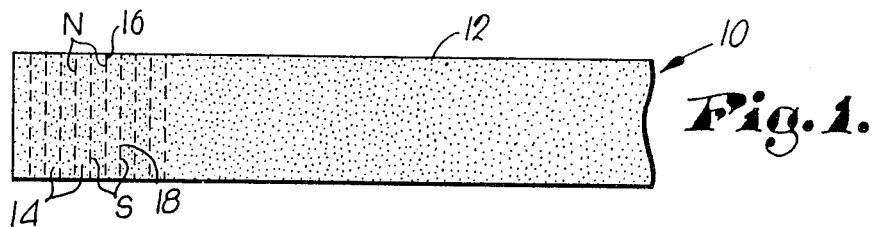
FIG. 1 is a plan view of an elongated, generally planar strip of adhesive in accordance with the invention, with a number of zones or regions of enhanced magnetization each presenting a north and south pole are illustrated in phantom.

Attention is now directed to FIG. 1 which illustrates a particularly preferred form of the invention. In particular, an adhesive 10 in the form of an elongated, relatively thin, generally planar strip of adhesive 12 is provided which has dispersed therein a quantity of $BaFe_{12}O_{19}$. In this case, magnetization of the $BaFe_{12}O_{19}$ has been accomplished through the use of a conventional capacitor discharge magnetizer with a multiple-pole fixture. This has resulted in the formation of a series of side-by-side regions or zones 14 of enhanced magnetic properties. Each of these zones 14 present a north pole 16 along one longitudinal edge thereof, and a corresponding south pole 18 along the opposite longitudinal edge. Thus, the areas or zones 14 in effect serve as a series of magnets within the strip 12, such that the latter has a net magnetic field. Moreover, by virtue of the nature of the magnetizable substance employed, the field established is substantially permanent, and the strip 12 can be magnetically fastened or adhered to a ferrometallic surface.

Figure 2:
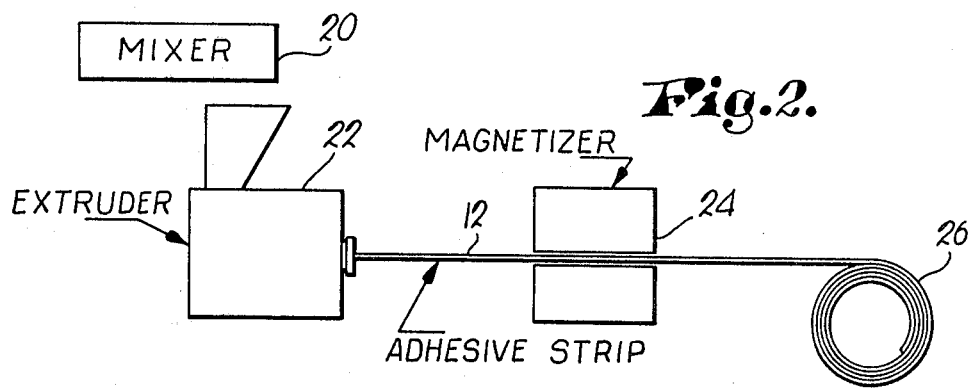
FIG. 2 is an essentially schematic view illustrating the preferred processing steps for making the preferred adhesive in accordance with the invention.

The preferred method for forming the preferred adhesive strip 12 is illustrated schematically in FIG. 2. First of all, the materials making up the adhesive, including for example, one or more synthetic resins and the magnetizable substance to be employed, are thoroughly admixed in a mixer 20. The mixer feeds into a conventional extruder 22, and the adhesive is extruded as the elongated strip 12. The next step involves passing the strip 12 through a magnetizer 14 whereupon the strip is magnetized as described above in order to give the adhesive a substantially permanent magnetic field. The permanently magnetized adhesive is then rolled or otherwise prepared for shipping and handling, as at 24. In some instances it may be necessary to heat mixer 20 in order to assure thorough mixing of the starting ingredients, and in addition the extruded strip 12 may require cooling prior to magnetization. However, these optional steps are essentially conventional and well within the skill of the art.

Figure 7:
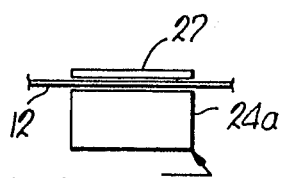
FIG. 7 is a fragmentary, schematic illustration of another method of permanent magnetization of an adhesive strip in accordance with the invention.

The method specifically illustrated in FIG. 2 pertains to a situation where it is desired to produce the adhesive in accordance with the invention in the form of a self-sustaining, elongated strip. It will be readily appreciated though, that other shapes can be readily produced by altering the die of the extruder. For examle, in some instances it may be desirable to provide a magnetized adhesive of triangular or circular cross-section, and this can be accomplished without difficulty. Likewise, the pattern of magnetization effected through the use of magnetizer 24 can be varied at will, simply by altering the configuration and location of the electrical coils associated with the magnetizer. For example, in the case of a triangular body of adhesive, the north and south poles thereof can be arranged on opposed faces of the triangle. Moreover, as illustrated in FIG. 7, an electrical coil 24a can be provided adjacent one face of the strip 12 during magnetization, while a section 27 of a ferromagnetic metal is located adjacent the remaining face. Energization of coil 24a thus creates a magnetic field between the coil and section 27, and this in turn tends to magnetize one face of strip 12 to a greater extent than the opposed face. This situation is in contrast to the situation illustrated in FIG. 2 where magnetizer 24 serves to equally magnetize both faces of strip 12.

Figure 3:
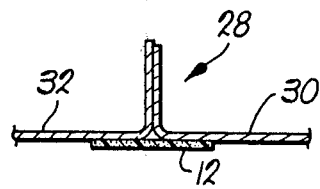
FIG. 3 is a fragmentary vertical sectional view of a joint between two metallic members, with a strip of adhesive in accordance with the invention positioned over the joint.

A preferred method of use of the adhesive in accordance with the invention is depicted in FIGS. 3–6. In FIG. 3, a joint 28 is defined between a pair of metallic (e.g., steel) members 30 and 32. A strip of adhesive 12 is placed along the length of joint 28 in overlying relationship to the latter. This placement can be easily accomplished by hand, simply by placing the strip over the joint so that the strip will magnetically adhere to the members 30 and 32. It will also be seen that should the strip 12 be accidentally misplaced relative to the joint 28, it is only necessary to manually shift the strip as necessary to assure proper positioning of the adhesive strip relative to the joint 28.

Figure 4:
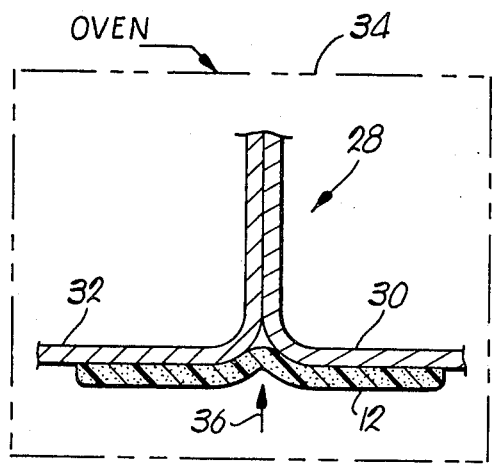
FIG. 4 is an enlarged vertical sectional view similar to FIG. 3 but showing the adhesive during heating thereof and consequent "pulling" of the adhesive into the joint by virtue of magnetic attraction.

In the next step of application of the adhesive, the latter is at least partially "pulled" into the joint 28 by virtue of the magnetic attraction between the adhesive 12 and the members 30 and 32. In the case of automobile production, where a strip 12 may be placed on the underside of a fender joint, the strip 12 would be heated in order to render the same at least partially flowable and thereby allow the described "pulling" action. As illustrated in FIG. 4, the automobile would be conventionally passed through an oven 34 during the paint curing process, and previously applied strips 12 of adhesive would during this heating be rendered partially flowable. This would in turn cause the portion of the strip 12 directly overlying the joint 28 to be "pulled" into the joint by virtue of magnetic forces. This action is illustrated by the arrow 36 of FIG. 4, which denotes the direction of flow of the adhesive into the joint.

Figure 5:
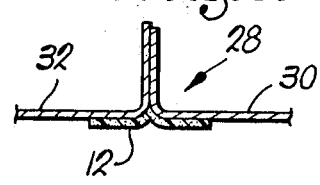
FIG. 5 is a fragmentary vertical sectional view similar to FIGS. 3 and 4, and illustrating the adhesive of the invention in fully set, sealing relationship to the joint, with a portion of the adhesive "pulled" into the joint itself.
Figure 6:
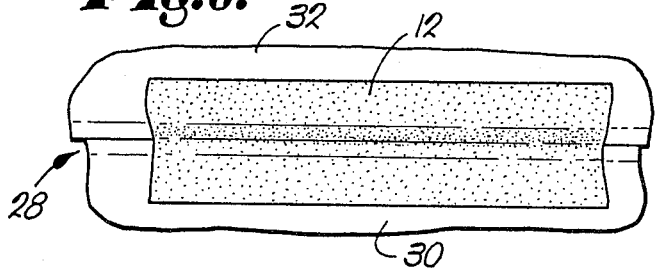
FIG. 6 is a fragmentary view illustrating the adhesively sealed joint of FIG. 5, viewed from the underside thereof.

After the adhesive 12 cools and sets, the portion thereof "pulled" into the joint 28 is retained therein as best seen in FIGS. 5 and 6, so that the joint 28 is effectively sealed. Furthermore, in the event that adhesive 12 is subjected at a later time to relatively high temperatures sufficient to render the same at least partially flowable, the adhesive will not sag downwardly under the influence of gravity as in the case of conventional adhesives. To the contrary, such an occurrence will in fact have a tendency to increase the integrity of the seal, since the adhesive will again be "pulled" into the joint because of the magnetic attraction between the adhesive and the metallic joint-defining members.

The following Examples illustrate the production of two particularly preferred adhesives in accordance with the invention. However, nothing in these Examples is to be taken as a limitation upon the overall scope of the invention.

EXAMPLE 1

The following ingredients were employed to make a thermoplastic, synthetic resin adhesive in accordance with the present invention:

TABLE I

| Material | Amount (g) | Identity - Supplier |
|---|---|---|
| $BaFe_{12}O_{19}$ | 1362 | Ferro Barium Ferrite #304 |

TABLE I-continued

| Material | Amount (g) | Identity - Supplier |
|---|---|---|
|  |  | Embedding Powder Chemical Composition $BaFe_{12}O_{19}$ Sp. gr. 5.1 Bulk Density 85#/ft.$^3$ Particle size (average) 1.8 microns Supplier: Ferro Corporation - Ottawa Chemical Division |
| Elvax 210 | 75 | Ethylene/Vinyl Acetate Copolymer Supplier: DuPont Company - Plastic Products Resin Dept. |
| Super B 2000 | 50 | Super Beckacite 2000 Phenolic Resin Supplier: Reichold Chemicals, Inc. |
| TTS | 26 | Isopropyl Triisostearol Titanate Supplier: Kenrich Petro-Chemicals |
| M-5W | 150 | Amorphous Polymer-Epolene M-5W Polymer Supplier: Eastman Industrial Chemicals |
| WT-95 | 50 | Wingtack 95 Resin Tackifier Supplier: Goodyear Chemicals |
| LM-MS | 50 | Vistanex polyisobutylene, grade LM-MS Supplier: Exxon Chemicals |

These materials were thoroughly admixed in a Baker-Perkins Sigma Blade Laboratory mixer according to the following schedule, with sufficient mixing between successive additions to assure that the mixture is lump free:

TABLE II

1. Add WT-95, Super B 2000 and Elvax 210 to Mixer, adding heat as necessary and mixing until lump free
2. Add 25 g M-5W and 150 g $BaFe_{12}O_{19}$
3. Add 25 g M-5W and 150 g $BaFe_{12}O_{19}$
4. Add 25 g M-5W and 150 g $BaFe_{12}O_{19}$
5. Add 25 g M-5W and 150 g $BaFe_{12}O_{19}$
6. Add 25 g M-5W and 150 g $BaFe_{12}O_{19}$
7. Add 25 g M-5W and 150 g $BaFe_{12}O_{19}$
8. Add TTS
9. Add LM-MS
10. Add Remainder of $BaFe_{12}O_{19}$ The completed admixture was then fed into a conventional laboratory extruder and extruded as an elongated, relatively thin, planar, substantially self- and shape-retaining strip. The strip was allowed to cool slightly and was thereafter segmentally magnetized by passing the strip through a Shester Engineering Company Model E3-10 Capacitor Discharge Magnetizer with Multi-pole fixture. The magnetizations were run at 400 volts DC, and the coils of the magnetizer were arranged to give the pattern of magnetization illustrated in FIG. 1. The completed adhesive exhibited a substantially permanent, net magnetic field.

EXAMPLE 2

A thermosetting magnetic adhesive sealant was made using the followng ingredients:

TABLE III

| Material | Amount (g) | Identity - Supplier |
|---|---|---|
| $BaFe_{12}O_{19}$ | 1000 | Ferro Barium Ferrite #304 Embedding Powder Chemical Composition $BaFe_{12}O_{19}$ |

TABLE III-continued

| Material | Amount (g) | Identity - Supplier |
|---|---|---|
| | | Sp. gr. 5.1
Bulk Density 85%/ft.$^3$
Particle Size (av) 1.8 microns
Supplier: Ferro Corporation -
Ottawa Chemical Division |
| WT-95 | 100 | Wingtack 95 A Resin Tackifier
Supplier: Goodyear Chemicals |
| EY 907 | 300 | Vynathane Vinyl acetate-
ethylene (VAE) copolymers grade
EY 907 Vinyl acetate content 60%
Supplier: U.S.I. Chemicals |
| DUP | 110 | Diundecyl Phthalate - a high
molecular weight phthalate
plasticizer
Supplier: Monsanto Industrial
Chemicals Co. |
| ZNO | 15 | Zinc Oxide A20-77 An
accelerator-activator
Supplier: American Zinc
Sales Company |
| Stearate | 3 | Hydrofoil Acid 1800 -
Stearic Acid
Supplier: Ashland Chemical |
| TBP | 6 | T-Butyl Perbensoate, An
organic Peroxide Catalyst
Supplier: Pennwalt Lucidol
Chemicals Div. |
| SR-350 | 6 | Sertomer SR-350 Trimethylol-
propane Trimethacrylate - A
trifunctional cross-linking
agent
Supplier: Sartomer Company |

These materials were completely mixed in a laboratory mixer according to the following schedule, with sufficient mixing after each addition to assure a lump-free condition:

TABLE IV

1. Add EY 907 to mixer - Mix until lump free
2. Add WT-95 and 250 g BaFe$_{12}$O$_{19}$
3. Add DUP and BaFe$_{12}$O$_{19}$ until all in mixture
4. Add ZNO, Stearate, SR-350 and TBP The completed admixture was then extruded and magnetized as described in Example 1 to give an adhesive sealant strip having the magnetic pattern illustrated in FIG. 1.

I claim:

1. A method of sealing a joint between two members, at least one of which is metallic, comprising the steps of:
   providing a quantity of synthetic resin adhesive having a particulate, permanently magnetized substance dispersed within and throughout the entirety of the synthetic resin, said substance serving to give the adhesive a substantially permanent, net magnetic field; and
   placing said adhesive in covering relationship to said joint and in adhering magnetic contact with said one member, and causing at least a portion of said adhesive to be pulled into said joint by virtue of the magnetic attraction between said one member and said particulate substance dispersed throughout said adhesive.

2. The method as set forth in claim 1 wherein said adhesive is in the form of a substantially self-sustaining body, and said method includes the step of heating said body after said placement thereof to render the same at least partially flowable, whereby a portion of the adhesive is pulled into said joint by virtue of said magnetic attraction.

3. The method as set forth in claim 2 wherein said body is in the form of an elongated, generally planar strip.

4. The method as set forth in claim 1 wherein both of said members are metallic.

* * * * *